(12) United States Patent
He

(10) Patent No.: US 11,151,977 B2
(45) Date of Patent: Oct. 19, 2021

(54) AUDIO PLAYBACK APPARATUS AND METHOD HAVING A NOISE-CANCELING MECHANISM

(71) Applicant: REALTEK SEMICONDUCTOR CORPORATION, Hsinchu (TW)

(72) Inventor: Wei-Hung He, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/923,586

(22) Filed: Jul. 8, 2020

(65) Prior Publication Data
US 2021/0210064 A1    Jul. 8, 2021

(30) Foreign Application Priority Data
Jan. 7, 2020    (TW) .................. 109100481

(51) Int. Cl.
*G10K 11/178*    (2006.01)
*G06F 3/16*    (2006.01)

(52) U.S. Cl.
CPC ........ *G10K 11/17854* (2018.01); *G06F 3/165* (2013.01); *G10K 11/17873* (2018.01); *G10K 2210/3027* (2013.01); *G10K 2210/3028* (2013.01)

(58) Field of Classification Search
CPC ....... G10K 11/17854; G10K 11/17873; G10K 2210/3027; G10K 2210/3028; G06F 3/165
USPC ....... 381/71.1, 71.2, 71.6, 71.8, 71.11, 71.12
See application file for complete search history.

(56) References Cited

U.S. PATENT DOCUMENTS

| 8,014,549 | B2 | 9/2011 | Kates |
| 8,693,700 | B2 | 4/2014 | Bakalos et al. |
| 8,718,289 | B2 | 5/2014 | Shridhar et al. |
| 8,718,291 | B2* | 5/2014 | Alves ............ H04R 3/005 381/71.11 |
| 9,741,332 | B2 | 8/2017 | Asada |
| 10,783,870 | B1* | 9/2020 | He ............ G10K 11/17823 |
| 11,062,689 | B2* | 7/2021 | Park ............ G10K 11/17817 |

(Continued)

OTHER PUBLICATIONS

Belt et al., "Cascaded all-pass sections for LMS adaptive filtering", 8th European Signal Processing Conference (Year: 1996).*

(Continued)

*Primary Examiner* — David L Ton
(74) *Attorney, Agent, or Firm* — WPAT, PC

(57) ABSTRACT

The present disclosure discloses an audio playback apparatus having a noise-canceling mechanism that includes an audio-receiving circuit, an adjusting parameter generation circuit, a frequency-warping filter circuit and an audio playback circuit. The audio-receiving circuit receives an audio signal. The adjusting parameter generation circuit generates adjusting parameters according to at least the audio signal. The frequency-warping filter circuit includes first order all pass filter units to filter the audio signal in series to generate a plurality of filtered results, multiplication units to respectively multiply each of the filtered results by one of adjusting parameters to generated adjusted filtered results and an adder circuit to add the filtered results to generate a noise-canceling signal. The audio playback circuit playbacks the audio signal and the noise-canceling signal at the same time.

18 Claims, 5 Drawing Sheets

(56) References Cited

U.S. PATENT DOCUMENTS

| | | | |
|---|---|---|---|
| 2006/0069556 A1* | 3/2006 | Nadjar | G10K 11/17881 704/229 |
| 2010/0014685 A1* | 1/2010 | Wurm | G10K 11/17823 381/71.11 |
| 2018/0190258 A1* | 7/2018 | Mohammad | G10K 11/17883 |
| 2019/0132679 A1* | 5/2019 | Poulsen | H04R 3/04 |

OTHER PUBLICATIONS

Dah-Chung Chang, Fei-Tao Chu , "Feedforward Active Noise Control With a New Variable Tap-Length and Step-Size Filtered-X LMS Algorithm" in IEEE/ACM Transactions on Audio, Speech, and Language Processing, vol. 22, No. 2, pp. 542-555, Feb. 2014, doi: 10.1109/TASLP.2013.2297016.

Markus Guldenschuh, "New Approaches for Active Noise Control Headphones" PhD Thesis at the University of Music and Performing Arts Graz, Institute of Electronic Music and Acoustics, University of Music and Performing Arts Graz 8010 Graz, Austria. Jun. 2014.

* cited by examiner

AUDIO PLAYBACK APPARATUS AND METHOD HAVING A NOISE-CANCELING MECHANISM

BACKGROUND OF THE INVENTION

1. Field of the Invention

The present disclosure relates to an audio playback apparatus and an audio playback method having a noise-canceling mechanism.

2. Description of Related Art

In order to provide users a better music listening experience, lots of earphones are equipped with noise-canceling mechanism to avoid the interference from environmental noises. In recent years, the earphones are equipped with an active noise-canceling mechanism such that a noise is received by using a microphone and an anti-noise signal having an inverted phase is delivered according to a filtering result of the noise based on filtering coefficients to cancel the effect of the noise.

However, if an adaptive filtering mechanism is used in an earphone, the filters having an order of several hundreds are required to reach an acceptable frequency resolution when a higher sampling rate is used for the filters. However, if a lower sampling rate is used, additional down conversion and up conversion of the frequencies result in the delay of the signals. When the amount of delay is too large, the noise-canceling mechanism is not able to instantly cancel the noise.

SUMMARY OF THE INVENTION

In consideration of the problem of the prior art, an object of the present disclosure is to provide an audio playback apparatus and an audio playback method having a noise-canceling mechanism.

The present disclosure discloses an audio playback apparatus having a noise-canceling mechanism that includes an audio-receiving circuit, an adjusting parameter generation circuit, a frequency-warping filter circuit and an audio playback circuit. The audio-receiving circuit is configured to receive a received audio signal. The adjusting parameter generation circuit is configured to generate a plurality of adjusting parameters at least according to the received audio signal. The frequency-warping filter circuit includes a plurality of first order all pass filter units, a plurality of multiplication units and an adder circuit. The first order all pass filter units are electrically coupled in series with an order and are configured to filter the received audio signal in the order to generate a plurality of filtered results. Each of the multiplication units is configured to multiply one of the received audio signal and the filtered results by one of the adjusting parameters to generated one of a plurality adjusted filtered results. The adder circuit is configured to add the adjusted filtered results to generate a noise-canceling signal. The audio playback circuit is configured to playback an actual audio signal and the noise-canceling signal at the same time.

The present disclosure also discloses an audio playback method having a noise-canceling mechanism used in an audio playback apparatus that includes the steps outlined below. A received audio signal is received by an audio-receiving circuit. A plurality of adjusting parameters are generated at least according to the received audio signal by an adjusting parameter generation circuit. By a plurality of first order all pass filter units of a frequency-warping filter circuit electrically coupled in series with an order, the received audio signal is filtered in the order to generate a plurality of filtered results. By each of a plurality of multiplication units of the frequency-warping filter circuit, one of the received audio signal and the filtered results are multiplied by one of the adjusting parameters to generated one of a plurality adjusted filtered results. By an adder circuit of the frequency-warping filter circuit, the adjusted filtered results are added to generate a noise-canceling signal. An actual audio signal and the noise-canceling signal are playback at the same time by an audio playback circuit.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide an audio playback apparatus and an audio playback method having a noise-canceling mechanism to compress the received audio signal to the low frequency range through the use of the frequency-warping filter circuit such that the frequency-warping filter circuit is able to operate under high sampling rate without the need to have too many orders.

Figure 1:
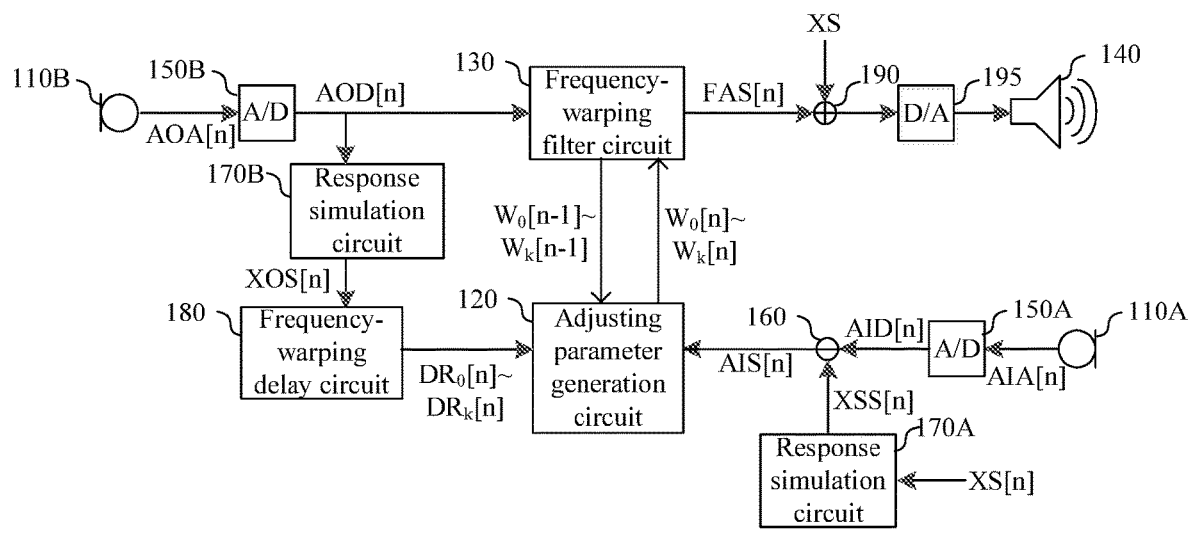
FIG. 1 illustrates a block diagram of an audio playback apparatus having a noise-canceling mechanism according to an embodiment of the present invention.

Reference is now made to FIG. 1. FIG. 1 illustrates a block diagram of an audio playback apparatus 100 having a noise-canceling mechanism according to an embodiment of the present invention. The audio playback apparatus 100 includes audio-receiving circuits 110A and 110B, an adjusting parameter generation circuit 120, a frequency-warping filter circuit 130 and an audio playback circuit 140.

In an embodiment, the audio receiving circuit 110A is an internal audio receiving circuit. The audio receiving circuit 110B is an external audio receiving circuit. In an embodiment, the audio playback apparatus 100 is such as, but not limited to an earphone and includes a housing (not illustrated). The circuits used to perform audio processing and playback, e.g. the adjusting parameter generation circuit 120, the frequency-warping filter circuit 130 and the audio playback circuit 140 are disposed inside of the housing. The audio receiving circuit 110A is also disposed inside of the housing, while the audio receiving circuit 110B is disposed outside of the housing.

The audio-receiving circuits 110A and 110B respectively receive a received audio signal AIA[n] and a received audio signal AOA[n]. More specifically, the internal audio-receiving circuit 110A is disposed inside of the housing to receive the internal received audio signal AIA[n] within the housing. On the contrary, the external audio-receiving circuit 110B is disposed outside of the housing to receive the external received audio signal AOA[n] outside of the housing. Different values of the parameter n correspond to different time spots.

In an embodiment, the audio playback apparatus 100 further includes an analog to digital conversion circuit 150A (labeled as A/D in FIG. 1) and a subtraction circuit 160. The analog to digital conversion circuit 150A is configured to receive the internal received audio signal AIA[n] in an analog form to perform an analog to digital conversion on the internal received audio signal AIA[n] to generate an internal received audio signal AID[n] in a digital form. Since an actual audio signal XS[n] (includes such as music or human voice) playback by the audio playback circuit 140 disposed inside of the housing is also received by the internal audio receiving circuit 110A, the subtraction circuit 160 is configured to subtract a component corresponding to the actual audio signal XS[n] from the internal received audio signal AID[n] to generate an actual internal received audio signal AIS[n].

In an embodiment, in order to simulate a frequency response of a path from the playback of the audio playback circuit 140 to the receipt of the of internal sound receiving circuit 110A, the audio playback apparatus 100 may further include a response simulation circuit 170A to filter the actual audio signal XS[n] by using the frequency response of the path to generate a simulated actual audio signal XSS[n]. The subtraction circuit 160 actually subtracts the simulated actual audio signal XSS[n] from the internal received audio signal AID[n] to generate the actual internal received audio signal AIS[n].

In an embodiment, the audio playback apparatus 100 may further include an analog to digital converter 150B (labeled as A/D in FIG. 1) configured to receive the external received audio signal AOA[n] in an analog form from the external sound receiving circuit 110B to perform an analog to digital conversion to generate an external received audio signal AOD[n] in a digital form. Since the external sound receiving circuit 110B does not receive the actual audio signal XS[n] playback by the audio playback circuit 140, no subtraction is required to be performed on the external received audio signal AOD[n].

Figure 2:
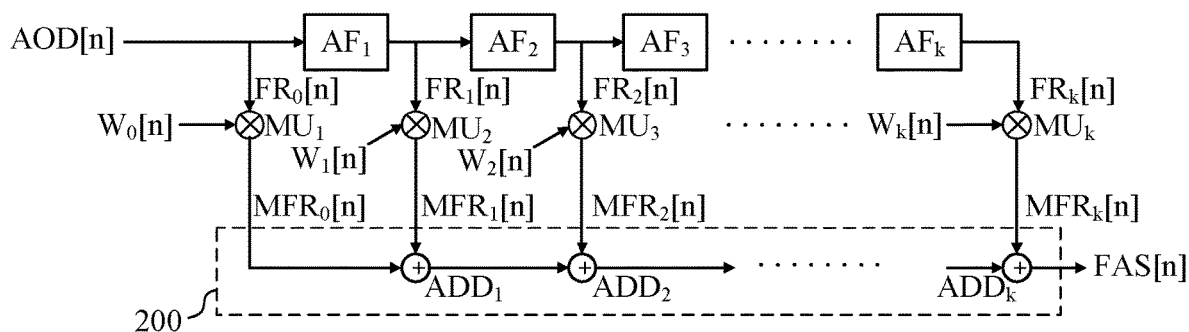
FIG. 2 illustrates a detailed block diagram of the frequency-warping filter circuit according to an embodiment of the present invention.

Reference is now made to FIG. 2 at the same time. FIG. 2 is a detailed block diagram of the frequency-warping filter circuit 130 according to an embodiment of the present invention. The frequency-warping filter circuit 130 includes a plurality of first order all pass filter units $AF_1 \sim AF_k$ electrically coupled in series with an order, a plurality of multiplication units $MU_0 \sim MU_k$ and an adder circuit 200.

The first order all pass filter units $AF_1 \sim AF_k$ are configured to filter the external received audio signal AOD[n] in the order to generate a plurality of filtered results $FR_1[n] \sim FR_k[n]$. Different values of the parameter k represents different orders of the first order all pass filter units $AF_1 \sim AF_k$ in the frequency-warping filter circuit 130.

In an embodiment, the response of each of the first order all pass filter units $AF_1 \sim AF_k$ on the z domain is represented as A(z), in which A(z)=(−a+z−1)/(1−a×z−1). In the equation described above, the parameter a is a value within the range of 0-1. In an embodiment, when the value of a is larger, the filtered result has less delay in a high frequency range to have a lower resolution and has more delay in a low frequency range to have a higher resolution.

Each of the multiplication units $MU_0 \sim MU_k$ is configured to multiply one of the received audio signal AOD[n] and the filtered results $FR_1[n] \sim FR_k[n]$ by one of the adjusting parameters $W_0[n] \sim W_k[n]$ to generated one of a plurality adjusted filtered results $MFR_0 \sim MFR_k$.

More specifically, the multiplication unit $MU_0$ multiplies the received audio signal AOD[n] and the adjusting parameter $W_0[n]$ to generate the adjusted filtered result $MFR_0$. The multiplication unit $MU_1$ multiplies the filtered result $FR_1[n]$ and the adjusting parameter $W_1[n]$ to generate the adjusted filtered result $MFR_1$. The rest of the multiplication units perform identical operations until the multiplication unit $MU_k$ multiplies the filtered result $FR_k[n]$ and the adjusting parameter $W_k[n]$ to generate the adjusted filtered result $MFR_k$.

The adder circuit 200 is configured to add the adjusted filtered results $MFR_0 \sim MFR_k$ to generate a noise-canceling signal FAS[n]. In an embodiment, the adder circuit 200 includes a plurality adder units $ADD_1 \sim ADD_k$. The adder unit $ADD_1$ adds the adjusted filtered result $MFR_0$ and the adjusted filtered result $MFR_1$. The adder unit $ADD_2$ adds the added result from the adder unit $ADD_1$ and the adjusted filtered result $MFR_2$. The rest of the adder units perform identical operations until the adder unit $ADD_k$ adds the added result from the adder unit $ADD_{k-1}$ and the adjusted filtered result $MFR_k$ to output a noise-canceling signal FAS[n]. The response of the noise-canceling signal FAS[n] can be expressed as:

$$FAS[n] = \sum_{K=0}^{k} W_K FR_K[n]$$

Since the values of the adjusting parameters $W_0[n] \sim W_k[n]$ vary along with time, the frequency-warping filter circuit 130 is an adaptive filter circuit.

The adjusting parameter generation circuit 120 is configured to generate the adjusting parameters $W_0[n] \sim W_k[n]$ at least according to the received audio signal, e.g. the internal received audio signal AID[n] and the external received audio signal AOD[n].

In an embodiment, for the internal received audio signal AID[n], the adjusting parameter generation circuit 120 actually receives the actual internal received audio signal AIS[n], which is the subtraction result between the internal received audio signal AID[n] and simulated actual audio signal XSS[n] generated by the simulation of the response simulation circuit 170A.

In an embodiment, for the external received audio signal AOD[n], the adjusting parameter generation circuit 120 needs to receive the external received audio signal AOD[n] through the processing of response simulation and frequency warping.

More specifically, the audio playback apparatus 100 further includes a response simulation circuit 170B configured to simulate the frequency response of the path from the playback of the audio playback circuit 140 to the receipt of the of internal sound receiving circuit 110A so as to filter the external received audio signal AOD[n] according to the response of the path to generate a filtered received audio signal XOS[n].

Moreover, the audio playback apparatus 100 further includes a frequency-warping delay circuit 180 to perform filtering delay on the filtered received audio signal XOS[n] to generate a plurality delay results $DR_0[n]$~$DR_k[n]$.

Figure 3:
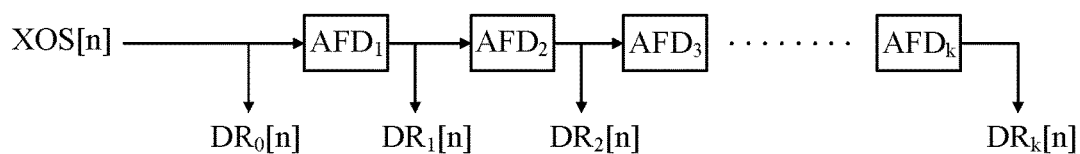
FIG. 3 is a detailed block diagram of the frequency-warping delay circuit according to an embodiment of the present invention.

Reference is now made to FIG. 3 at the same time. FIG. 3 is a detailed block diagram of the frequency-warping delay circuit 180 according to an embodiment of the present invention. The frequency-warping delay circuit 180 includes a plurality of first order all pass filtering delay units $AFD_1$~$AFD_k$ electrically coupled in series with an order and configured to filter and delay the filtered received audio signal XOS[n] in the order to generate the delay results $DR_0[n]$~$DR_k[n]$. The delay result $DR_0[n]$ is equivalent to the 0 delay result of the filtered received audio signal XOS[n]. The delay result $DR_1[n]$ is equivalent to the 1-unit delay result through the first order all pass filtering delay units $AFD_1$ of the filtered received audio signal XOS[n]. The delay result $DR_2[n]$ is equivalent to the 2-unit delay result through the first order all pass filtering delay units $AFD_1$ and $AFD_2$ of the filtered received audio signal XOS[n]. Likewise, the delay result $DR_k[n]$ is equivalent to the k-unit delay result through the first order all pass filtering delay units $AFD_1$~$AFD_k$ of the filtered received audio signal XOS[n].

As a result, the adjusting parameter generation circuit 120 actually receives the delay results $DR_0[n]$~$DR_k[n]$, which are the results of the processing of response simulation and frequency-warping on the external received audio signal AOD[n].

In an embodiment, the adjusting parameter generation circuit 120 may generate the adjusting parameters $W_0[n]$~$W_k[n]$ according to such as, but not limited to the least mean square (LMS) algorithm. Take the adjusting parameter $W_0[n]$ as an example, the adjusting parameter $W_0[n]$ can be generated by using the following equation:

$$W_0[n]=W_0[n-1]-\mu \times AIS[n] \times DR_0[n]$$

In the equation described above, $W_0[n]$ is the adjusting parameter corresponding to the time spot n. $W_0[n-1]$ is the adjusting parameter corresponding to a previous time spot n−1. AIS[n] is the actual internal received audio signal corresponding to the time spot n. $DR_0[n]$ is the delay result corresponding to the time spot n. $\mu$ is an adjustable parameter, in which the value thereof determines a convergence speed.

All the adjusting parameters $W_K[n]$ can be generated by performing calculation on the corresponding previous adjusting parameter $W_{K-1}[n]$ and the delay result $DR_K[n]$ by using the parameter $\mu$ and actual internal received audio signal AIS[n], in which the range of K is 0~k.

In other embodiments, the adjusting parameter generation circuit 120 can also generate the adjusting parameters $W_0[n]$~$W_k[n]$ according to a normalized LMS (NLMS) algorithm or other suitable algorithms. The present invention is not limited thereto.

Based of the above description, the adjusting parameter generation circuit 120 actually generates the adjusting parameters $W_0[n]$~$W_k[n]$ according to the delay results $DR_0[n]$~$DR_k[n]$, the internal received audio signal AIS[n] and the previous adjusting parameters $W_0[n-1]$~$W_k[n-1]$. The previous adjusting parameters $W_0[n-1]$~$W_k[n-1]$ can be fed back after the operation of the frequency-warping filter circuit 130, as illustrated in FIG. 1, or be stored in an additional storage circuit (not illustrated) disposed in the audio playback apparatus 100 to be retrieved when the previous adjusting parameters $W_0[n-1]$~$W_k[n-1]$ are in need.

As a result, after the external received audio signal AOD[n] is filtered according to the adjusting parameters $W_0[n]$~$W_k[n]$ generated by the adjusting parameter generation circuit 120, the frequency-warping filter circuit 130 outputs the noise-canceling signal FAS[n]. The audio playback circuit 140 is configured to playback the actual audio signal XS[n] and the noise-canceling signal FAS[n] at the same time.

In an embodiment, the audio playback apparatus 100 further includes a synthesis circuit 190 and a digital to analog conversion circuit 195 (labeled as D/A in FIG. 1). The synthesis circuit 190 adds the actual audio signal XS[n] and the noise-canceling signal FAS[n] such that the digital to analog conversion circuit 195 performs a digital to analog conversion on the added result so as to be playback by the audio playback circuit 140.

In some approaches, the order of the filter units in the filter circuit needs to be high to process the received audio signal so as to accomplish a sufficient frequency resolution. When a lower sampling rate is used, not only the decreasing of the order is not enough, but also additional down conversion and up conversion of the frequencies of the signals are required to cause unnecessary delay.

As a result, the audio playback apparatus 100 can compress the received audio signal, e.g. the external received audio signal AOD[n], to a low frequency range of such as but not limited to 20 Hz to 2000 Hz that the human ears can perceive through the use of the frequency-warping filter circuit 130. As a result, the frequency-warping filter circuit 130 is able to operate under a high sampling rate (such as but not limited to 768 KHz) without a high order of filters (such as but not limited to an order lower than 30).

In the audio playback apparatus 100 described above, the frequency-warping filter circuit 130 is used to filter the external received audio signal AOD[n] to generate the noise-canceling signal FAS[n] to accomplish the noise-canceling operation with a feed-forward mechanism. In other embodiments, the audio playback apparatus may use a feedback mechanism that generates the noise-canceling signal according to only the internal received audio signal AID[n].

Figure 4:
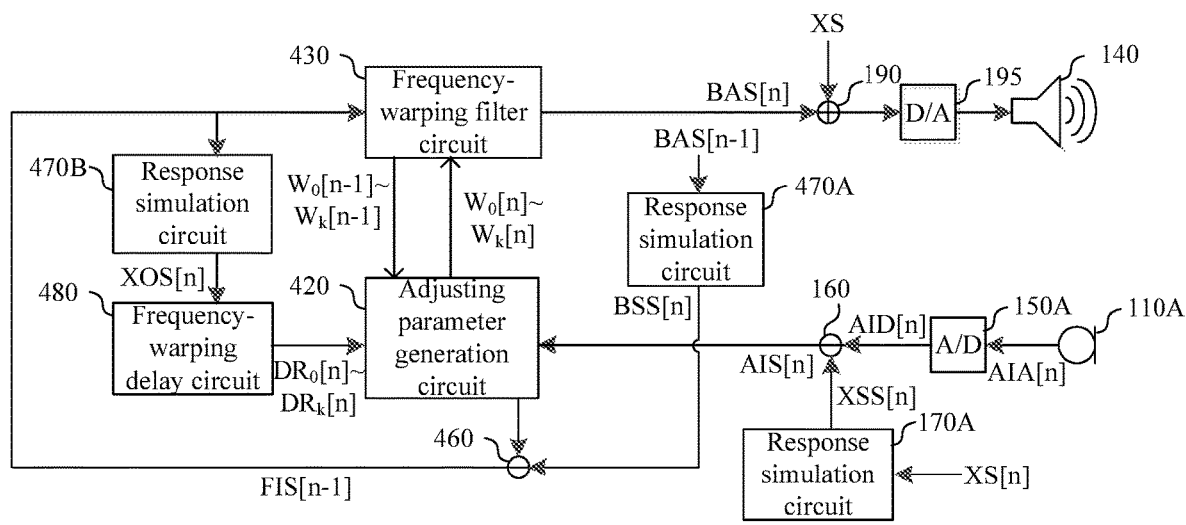
FIG. 4 illustrates a block diagram of an audio playback apparatus having a noise-canceling mechanism according to an embodiment of the present invention.

Reference is now made to FIG. 4. FIG. 4 is a block diagram of an audio playback apparatus 400 having a noise-canceling mechanism according to an embodiment of the present invention. The audio playback apparatus 400 includes the audio-receiving circuit 110A, an adjusting parameter generation circuit 420, a frequency-warping filter circuit 430 and the audio playback circuit 140.

In the present embodiment, the audio playback apparatus 400 only includes the internal audio-receiving circuit 110A to receive the internal received audio signal AIA[n].

The audio playback apparatus 400 may further include the analog to digital conversion circuit 150A (labeled as A/D in FIG. 4) and the subtraction circuit 160. The analog to digital conversion circuit 150A is configured to receive the internal received audio signal AIA[n] in an analog form to perform an analog to digital conversion on the internal received audio signal AIA[n] to generate the internal received audio signal AID[n] in a digital form. The subtraction circuit 160 is configured to subtract the component corresponding to the actual audio signal XS[n] from the internal received audio signal AID[n] to generate the actual internal received audio signal AIS[n].

Further, the audio playback apparatus 400 includes the response simulation circuit 170A to filter the actual audio signal XS[n] by using the frequency response of the path to generate the simulated actual audio signal XSS[n]. The subtraction circuit 160 actually subtract the simulated actual audio signal XSS[n] from the internal received audio signal AID[n] to generate the actual internal received audio signal AIS[n].

The configuration of the frequency-warping filter circuit 430 is identical to the frequency-warping filter circuit 130 illustrated in FIG. 2. As a result, no detailed described is further made herein. The difference therebetween is that the frequency-warping filter circuit 430 in FIG. 4 receives the fed received audio signal FIS[n] generated by subtracting a previous noise-canceling signal BAS[n−1] from the actual internal received audio signal AIS[n] to perform frequency-warping filtering to generate a feedback noise-canceling signal BAS[n]. In an embodiment, the audio playback apparatus 400 further includes a response simulation circuit 470A and a subtraction circuit 460. The response simulation circuit 470A is configured to receive the noise-canceling signal BAS[n−1] from the frequency-warping filter circuit 430 to perform filtering by using the frequency response of the path to generate a simulated noise-canceling signal BSS[n]. The subtraction circuit 460 further subtracts the noise-canceling signal BSS[n] from the actual internal received audio signal AIS[n] to generate the fed received audio signal FIS [n] so as to perform the frequency-warping filtering by the frequency-warping filter circuit 430.

Further, the adjusting parameter generation circuit 420 generates the adjusting parameters $W_0[n] \sim W_k[n]$ according to the received audio signal, e.g. the internal received audio signal AIS[n].

In an embodiment, the audio playback apparatus 400 further includes a response simulation circuit 470B and a frequency-warping delay circuit 480 respectively perform filtering of response simulation and frequency-warping delay to generate delayed results $DR_0[n] \sim DR_k[n]$. The adjusting parameter generation circuit 420 can thus generate the adjusting parameters $W_0[n] \sim W_k[n]$ according to the delayed results $DR_0[n] \sim DR_k[n]$, the internal received audio signal AIS[n] and the previous adjusting parameters $W_0[n-1] \sim W_k[n-1]$.

As a result, after performing filtering on the fed received audio signal FIS [n] according to the adjusting parameters $W_0[n] \sim W_k[n]$ generated by the adjusting parameter generation circuit 420, the frequency-warping filter circuit 430 outputs a noise-canceling signal BAS[n]. The audio playback circuit 140 playbacks the actual audio signal XS[n] and the noise-canceling signal BAS[n] at the same time.

In an embodiment, the audio playback apparatus 400 may further include the synthesis circuit 190 and the digital to analog conversion circuit 195. The synthesis circuit 190 adds the actual audio signal XS[n] and the noise-canceling signal BAS[n] such that the digital to analog conversion circuit 195 performs a digital to analog conversion on the added result so as to be playback by the audio playback circuit 140.

Figure 5:
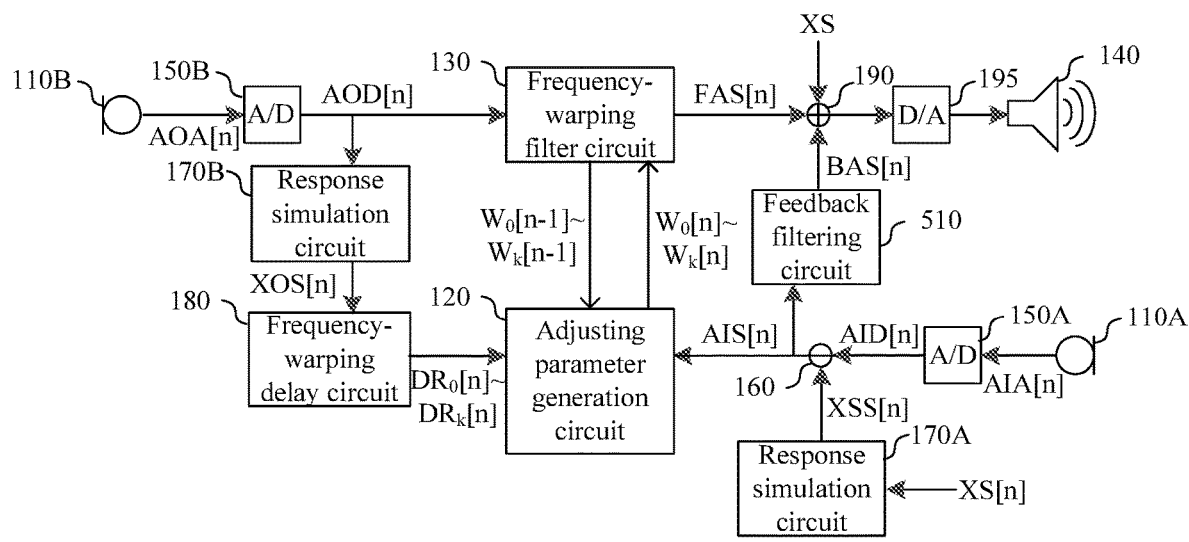
FIG. 5 illustrates a block diagram of an audio playback apparatus having a noise-canceling mechanism according to an embodiment of the present invention.

Reference is now made to FIG. 5. FIG. 5 is a block diagram of an audio playback apparatus 500 having a noise-canceling mechanism according to an embodiment of the present invention. The audio playback apparatus 500 includes the audio-receiving circuits 110A and 110B, the adjusting parameter generation circuit 120, the frequency-warping filter circuit 130 and the audio playback circuit 140. These components are identical to the corresponding components illustrated in FIG. 1 for perform the feed-forward filtering mechanism to generate the noise-canceling signal FAS[n].

In the present embodiment, the audio playback apparatus 500 further includes a feedback filtering circuit 510, in which the filtering circuit 510 may include the adjusting parameter generation circuit 420, the frequency-warping filter circuit 430, the subtraction circuit 460, the response simulation circuit 470A, the response simulation circuit 470B and the frequency-warping delay circuit 480 included in the audio playback apparatus 400 in FIG. 4 to perform the feedback filtering mechanism to generate the noise-canceling signal BAS[n].

In an embodiment, the audio playback apparatus 500 may further include the synthesis circuit 190 and the digital to analog conversion circuit 195. The synthesis circuit 190 adds the actual audio signal XS[n], the noise-canceling signal FAS[n] and the noise-canceling signal BAS[n] such that the digital to analog conversion circuit 195 performs a digital to analog conversion on the added result so as to be playback by the audio playback circuit 140.

As a result, the audio playback apparatus 500 can adapt the feed-forward and the feedback mechanisms at the same time to generate the noise-canceling signals.

It is appreciated that the feed-forward and the feedback mechanisms both using an adaptive filtering method described above is merely an example. In other embodiments, the audio playback apparatus can selectively adapt the feed-forward mechanism using the adaptive filtering method and the feedback mechanism using a fixed-coefficient filtering method or adapt the feed-forward mechanism using the fixed-coefficient filtering method and the feedback mechanism using the adaptive filtering method.

In an embodiment, in order to have a better performance, the audio playback apparatus 100 may selectively dispose a fixed-coefficient boost filter behind the analog to digital conversion circuit 150B to perform an enhancing filtering on the external received audio signal AOD[n] after the analog to digital conversion is performed. A certain frequency band can be enhanced, such as but not limited to increase the gain of the low frequency range, to become beneficial of the processing of the subsequent circuits, e.g. the frequency-warping filter circuit 130 and the response simulation circuit 170B.

In another embodiment, in order to have a better performance, the audio playback apparatus 100 may selectively dispose a band pass filter between the analog to digital conversion circuit 150B and the response simulation circuit 170B to perform filtering on the external received audio signal AOD[n] after the analog to digital conversion. The ratio of certain frequency bands can be enhanced such that the convergence is focused to certain frequency bands, e.g. 200 Hz to 1 KHz to become beneficial of the processing of the subsequent circuits, e.g. the response simulation circuit 170B.

The two filtering mechanisms described above can both be applied to the paths in the feedback mechanism.

Figure 6:
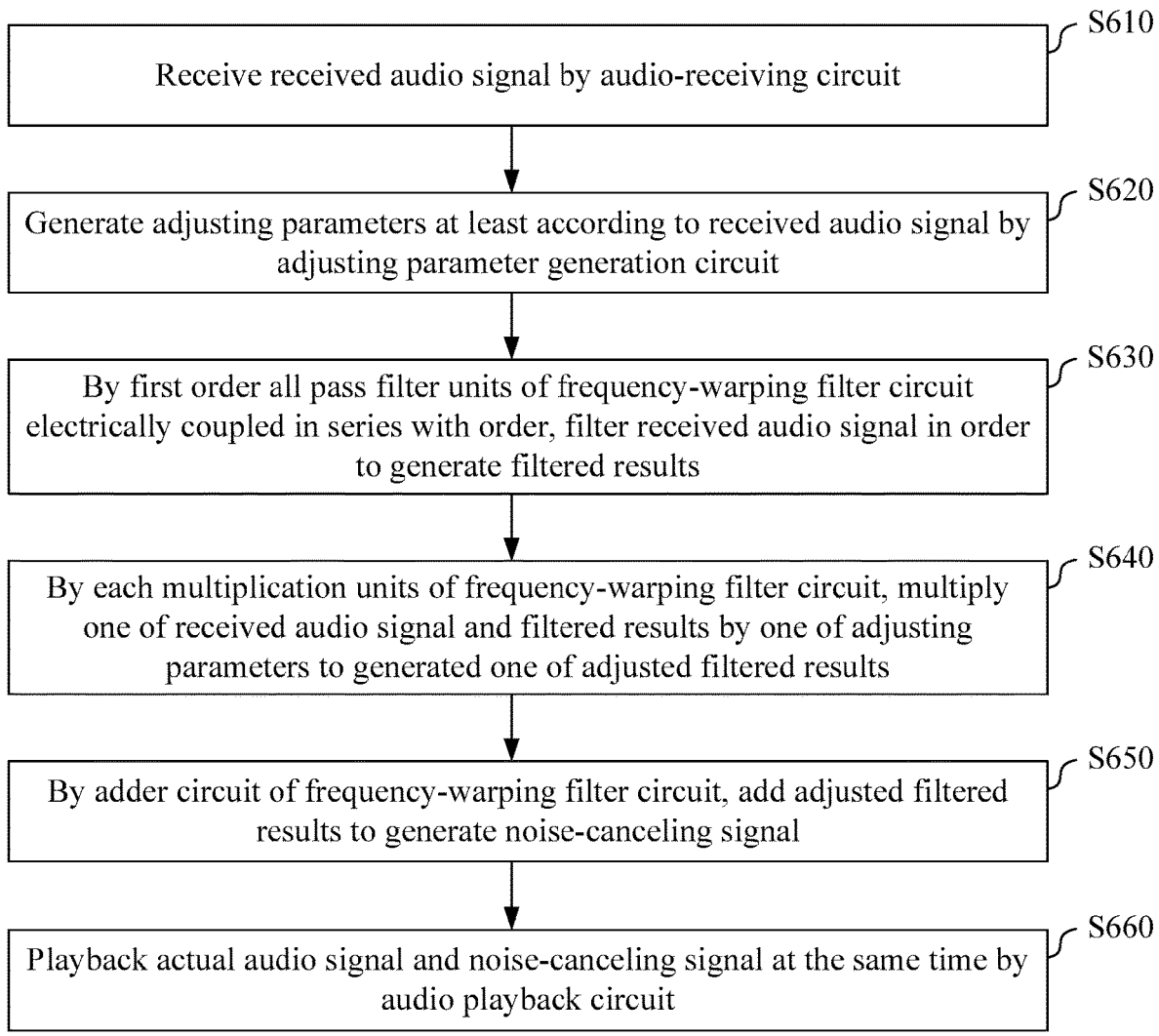
FIG. 6 illustrates a flow chart of an audio playback method having a noise-canceling mechanism according to an embodiment of the present invention.

Reference is now made to FIG. 6. FIG. 6 illustrates a flow chart of an audio playback method 600 having a noise-canceling mechanism according to an embodiment of the present invention.

Besides the device described above, the present invention further provides the audio playback method 600 that can be used in such as, but not limited to the audio playback apparatus 100 in FIG. 1. As illustrated in FIG. 6, an embodiment of the audio playback method 600 includes the following steps.

In step S610, the received audio signal is received by the audio-receiving circuit.

In an embodiment, the audio-receiving circuit may include the internal audio-receiving circuit 110A and/or the external audio-receiving circuit 110B to receive the received audio signal including the internal received audio signal AIA and/or the external received audio signal AOD.

In step S620, the adjusting parameters $W_0[n]$~$W_k[n]$ are generated at least according to the received audio signal by the adjusting parameter generation circuit 120.

In step S630, by the first order all pass filter units $AF_1$~$AF_k$ of the frequency-warping filter circuit 130 electrically coupled in series with the order, the received audio signal AOD is filtered in the order to generate the filtered results $FR_1[n]$~$FR_k[n]$.

In step S640, by each of the multiplication units $MU_0$~$MU_k$ of the frequency-warping filter circuit 130, one of the received audio signal AOD and the filtered results $FR_1[n]$~$FR_k[n]$ are multiplied by one of the adjusting parameters $W_0[n]$~$W_k[n]$ to generated one of the adjusted filtered results $MFR_0$~$MFR_k$.

In step S650, by the adder circuit 200 of the frequency-warping filter circuit 130, the adjusted filtered results $MFR_0$~$MFR_k$ are added to generate the noise-canceling signal FAS[n].

In step S660, the actual audio signal XS and the noise-canceling signal FAS[n] are playback at the same time by the audio playback circuit 140.

The flow described above uses the feed-forward mechanism as an example. In an embodiment, the flow described above can be applied to the feedback mechanism as well.

It is appreciated that the embodiments described above are merely an example. In other embodiments, it should be appreciated that many modifications and changes may be made by those of ordinary skill in the art without departing, from the spirit of the invention.

In summary, the audio playback apparatus and the audio playback method having a noise-canceling mechanism of the present invention can compress the received audio signal to a low frequency range through the use of the frequency-warping filter circuit. As a result, the frequency-warping filter circuit is able to operate under a high sampling rate without a high order of filters.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. An audio playback apparatus having a noise-canceling mechanism, comprising:
   an audio-receiving circuit configured to receive a received audio signal;
   an adjusting parameter generation circuit configured to generate a plurality of adjusting parameters at least according to the received audio signal;
   a frequency warping filter circuit comprising:
      a plurality of first order all pass filter units electrically coupled in series with an order and configured to filter the received audio signal in the order to generate a plurality of filtered results;
      a plurality of multiplication units each configured to multiply one of the received audio signal and the filtered results by one of the adjusting parameters to generated one of a plurality adjusted filtered results; and
      an adder circuit configured to add the adjusted filtered results to generate a noise-canceling signal; and
   an audio playback circuit configured to playback an actual audio signal and the noise-canceling signal at the same time.

2. The audio playback apparatus of claim 1, wherein the audio playback circuit is disposed inside of a housing, and the audio-receiving circuit is an internal audio-receiving circuit disposed inside of the housing such that the received audio signal is an internal received audio signal, the audio playback apparatus further comprises:
   an analog to digital conversion circuit configured to perform an analog to digital conversion on the internal received audio signal; and
   a subtraction circuit configured to subtract a component corresponding to the actual audio signal from the internal received audio signal to generate an actual internal received audio signal such that the first order all pass filter units performs filtering according to the actual internal received audio signal and the adjusting parameter generation circuit generates the adjusting parameters according to the actual internal received audio signal.

3. The audio playback apparatus of claim 2, wherein the first order all pass filter units actually receive a fed received audio signal generated by subtracting a component of a previous noise-canceling signal from the actual internal received audio signal, and the audio playback apparatus further comprises:
   a first response simulation circuit configured to filter the fed received audio signal according to a frequency response between the audio playback circuit and the internal audio receiving circuit to generate a filtered received audio signal; and
   a frequency warping delay circuit comprising a plurality of first order all pass filtering delay units electrically coupled in series with an order and configured to filter and delay the filtered received audio signal in the order to generate a plurality of delay results;
   wherein the adjusting parameter generation circuit actually generates the adjusting parameters according to the delay results, the internal received audio signal and a plurality of previous adjusting parameters.

4. The audio playback apparatus of claim 2, further comprising a second response simulation circuit configured to filter the actual audio signal according to a frequency response between the audio playback circuit and the internal audio receiving circuit to generate a simulated actual audio signal, and the subtraction circuit is configured to subtract the simulated actual audio signal from the internal received audio signal to generate the actual internal received audio signal.

5. The audio playback apparatus of claim 1, wherein the audio playback circuit is disposed inside of a housing, and the audio-receiving circuit is an external audio-receiving circuit disposed outside of the housing such that the received audio signal is an external received audio signal, the audio playback apparatus further comprises:
   a first analog to digital conversion circuit configured to perform an analog to digital conversion on the external received audio signal.

6. The audio playback apparatus of claim 5, further comprising a fixed-coefficient boost filter configured to perform an enhancing filtering on the external received audio signal after the analog to digital conversion is performed.

7. The audio playback apparatus of claim 5, further comprising:

an internal audio-receiving circuit disposed inside of the housing and configured to receive an internal received audio signal;

an analog to digital conversion circuit configured to perform an analog to digital conversion on the internal received audio signal; and a subtraction circuit configured to subtract a component corresponding to the actual audio signal from the internal received audio signal to generate an actual internal received audio signal;

wherein the adjusting parameter generation circuit is configured to generate the adjusting parameters according to the external received audio signal after the analog to digital conversion and the enhancing filtering are performed and according to the actual internal received audio signal.

8. The audio playback apparatus of claim 7, further comprising:

a first response simulation circuit configured to filter the external received audio signal according to a frequency response between the audio playback circuit and the internal audio receiving circuit to generate a filtered received audio signal; and a frequency warping delay circuit comprising a plurality of first order all pass filtering delay units electrically coupled in series with an order and configured to filter and delay the filtered received audio signal in the order to generate a plurality of delay results;

wherein the adjusting parameter generation circuit actually generates the adjusting parameters according to the delay results, the actual internal received audio signal and a plurality of previous adjusting parameters.

9. The audio playback apparatus of claim 7, further comprising a second response simulation circuit configured to filter the actual audio signal according to a frequency response between the audio playback circuit and the internal audio receiving circuit to generate a simulated actual audio signal, and the subtraction circuit is configured to subtract the simulated actual audio signal from the internal received audio signal to generate the actual internal received audio signal.

10. An audio playback method having a noise-canceling mechanism used in an audio playback apparatus, comprising:

receiving a received audio signal by an audio-receiving circuit;

generating a plurality of adjusting parameters at least according to the received audio signal by an adjusting parameter generation circuit;

by a plurality of first order all pass filter units of a frequency warping filter circuit electrically coupled in series with an order, filtering the received audio signal in the order to generate a plurality of filtered results;

by each of a plurality of multiplication units of the frequency warping filter circuit, multiplying one of the received audio signal and the filtered results by one of the adjusting parameters to generated one of a plurality adjusted filtered results;

by an adder circuit of the frequency warping filter circuit, adding the adjusted filtered results to generate a noise-canceling signal; and playbacking an actual audio signal and the noise-canceling signal at the same time by an audio playback circuit.

11. The audio playback method of claim 10, wherein the audio playback circuit is disposed inside of a housing, and the audio-receiving circuit is an internal audio-receiving circuit disposed inside of the housing such that the received audio signal is an internal received audio signal, the audio playback method further comprises:

performing an analog to digital conversion on the internal received audio signal by an analog to digital conversion circuit; and subtracting a component corresponding to the actual audio signal from the internal received audio signal by a subtraction circuit to generate an actual internal received audio signal such that the first order all pass filter units performs filtering according to the actual internal received audio signal and the adjusting parameter generation circuit generates the adjusting parameters according to the actual internal received audio signal.

12. The audio playback method of claim 11, wherein the first order all pass filter units actually receive a fed received audio signal generated by subtracting a component of a previous noise-canceling signal from the actual internal received audio signal, and the audio playback method further comprises:

filtering the fed received audio signal according to a frequency response between the audio playback circuit and the internal audio receiving circuit to generate a filtered received audio signal by a first response simulation circuit; and by a frequency warping delay circuit comprising a plurality of first order all pass filtering delay units electrically coupled in series with an order, filtering and delaying the filtered received audio signal in the order to generate a plurality of delay results;

generating the adjusting parameters according to the delay results, the internal received audio signal and a plurality of previous adjusting parameters by the adjusting parameter generation circuit.

13. The audio playback method of claim 11, further comprising:

filtering the actual audio signal according to a frequency response between the audio playback circuit and the internal audio receiving circuit by a second response simulation circuit to generate a simulated actual audio signal; and subtracting the simulated actual audio signal from the internal received audio signal to generate the actual internal received audio signal by the subtraction circuit.

14. The audio playback method of claim 10, wherein the audio playback circuit is disposed inside of a housing, and the audio-receiving circuit is an external audio-receiving circuit disposed outside of the housing such that the received audio signal is an external received audio signal, the audio playback method further comprises:

performing an analog to digital conversion on the external received audio signal by a first analog to digital conversion circuit.

15. The audio playback method of claim 14, further comprising:

performing an enhancing filtering on the external received audio signal after the analog to digital conversion is performed by a fixed-coefficient boost filter.

16. The audio playback method of claim 14, further comprising:

receiving an internal received audio signal by an internal audio-receiving circuit disposed inside of the housing;

performing an analog to digital conversion on the internal received audio signal by an analog to digital conversion circuit;

subtracting a component corresponding to the actual audio signal from the internal received audio signal to generate an actual internal received audio signal by a subtraction circuit; and generating the adjusting parameters according to the external received audio signal after the analog to digital conversion and the enhancing filtering are performed and according to the actual internal received audio signal by the adjusting parameter generation circuit.

17. The audio playback method of claim 16, further comprising:

filtering the external received audio signal according to a frequency response between the audio playback circuit and the internal audio receiving circuit to generate a filtered received audio signal by a first response simulation circuit; and by a frequency warping delay circuit comprising a plurality of first order all pass filtering delay units electrically coupled in series with an order, filtering and delaying the filtered received audio signal in the order to generate a plurality of delay results;

generating the adjusting parameters according to the delay results, the actual internal received audio signal and a plurality of previous adjusting parameters by the adjusting parameter generation circuit.

18. The audio playback method of claim 16, further comprising:

filtering the actual audio signal according to a frequency response between the audio playback circuit and the internal audio receiving circuit by a second response simulation circuit to generate a simulated actual audio signal; and subtracting the simulated actual audio signal from the internal received audio signal to generate the actual internal received audio signal by the subtraction circuit.

* * * * *